(No Model.)

E. T. GREENFIELD.
PIPE OR TUBE COUPLING.

No. 599,558. Patented Feb. 22, 1898.

Witnesses
Edward C. Howland.
M. M. Robinson.

Inventor,
Edwin T. Greenfield
By his Attorney
Charles J. Kintner

UNITED STATES PATENT OFFICE.

EDWIN T. GREENFIELD, OF NEW YORK, N. Y.

PIPE OR TUBE COUPLING.

SPECIFICATION forming part of Letters Patent No. 599,558, dated February 22, 1898.

Application filed June 10, 1897. Serial No. 640,110. (No model.)

*To all whom it may concern:*

Be it known that I, EDWIN T. GREENFIELD, a citizen of the United States, residing at New York, in the county of New York and State of New York, have made a new and useful Invention in Pipe or Tube Couplings, of which the following is a specification.

My invention is directed particularly to improvements in pipe or tube couplings designed to connect together the screw-threaded ends of two pipes or tubes adapted to be used as insulated conduits; and its object is to provide such a coupling with an insulating-thimble and non-fragile means for protecting the same from the destructive action of the ends of the screw-threaded pipes or tubes when joined together by the coupling.

For a full, clear, and exact understanding of the invention, such as will enable others skilled in the art to construct and use the same, reference is had to the following specification and accompanying drawings, in which—

Figure 1:
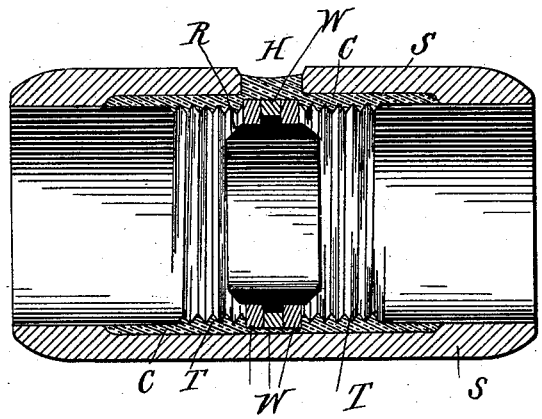
Figure 2:
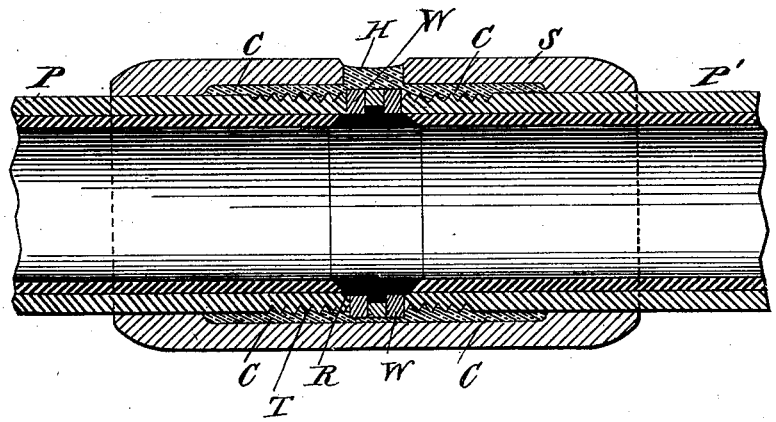

Figure 1 represents a longitudinal sectional view of my improved coupling, and Fig. 2 a similar sectional view illustrating also in section the ends of two adjoining insulating conduit pipes or tubes secured together by the coupling.

Referring now to the drawings in detail, S represents the coupling, which is made, preferably, of cast metal, and R an insulating-thimble, preferably of hard rubber, located near the center thereof, said thimble in turn being surrounded by non-fragile protecting means, here shown as three metallic washers, the outer washers being of smaller diameter for the purpose of securely holding the thimble in place.

P P' represent the ends of screw-threaded conduit-tubes, provided with any well-known form of insulating-lining adapted to abut against the ends of the thimble R when secured in position by the screw-threaded sleeve. The sleeve S is made, preferably, of cast metal and is hollowed out interiorly, as clearly shown, the inner diameters of its opposite ends being that of the exterior diameters of the tubes or pipes P P' to be connected, the arrangement being such that when said tubes are located in position with their inner ends abutting against the metallic washers W W there will remain a cylindrical opening around said tubular ends, H being a lateral hole or opening.

The improved coupling is constructed as follows: The insulating-thimble R, with its surrounding metallic washers W, is placed in the central position shown in Fig. 2 and the screw-threaded ends of the tubes caused to firmly abut against said rings. Molten metal, such as type-metal C, is then poured into the opening or hole H in sufficient quantity to fill the entire chamber surrounding the screw-threaded ends of the tubes and the washers W. This metal is allowed to cool, and the tubes are then removed, after which the structure of the coupling appears as shown in section in Fig. 1.

I have described and claimed in a prior patent, No. 595,437, granted to me on the 14th day of December, 1897, a pipe or tube coupling in which an insulating-thimble is held in a central position within the coupling in such manner that the ends of the insulated conduit-tubes may abut against the same when secured in position by screw-threads, the outer ends of said coupling constituting projecting sleeves. I have discovered that in actual use with such a coupling there is often great damage done to the insulating-thimble, owing to the fact that the screw-threaded tubes or pipes, if not carefully adjusted, will cause the insulating-thimble to be ruptured or seriously damaged to such an extent as to greatly impair the insulation at this point. It was with a view of overcoming this objectionable feature that the present invention was devised, it being apparent that when the free ends of the screw-threaded pipes P and P' are screwed firmly home they will abut against the metallic washers W, embedded in the solid metal C, thus leaving the insulating-linings of the tubes or pipes to assume their intended position against the opposite ends of the insulating-thimble R, which is firmly held in position by said washers.

Although I prefer to construct my improved coupling as hereinbefore described, I do not limit myself to this special structure of the device, as it is obvious that an insulating-thimble might be secured by a solid non-fragile protecting device which would resist the destructive effects of the screw-threaded ends of adjoining pipes or tubes, and my claims hereinafter made are of such scope as to include, broadly, a pipe or tube coupling having an interior insulating-thimble provided with non-fragile means for protecting it against the destructive action of adjoining tubes, whether said means be in the nature of an integral part of the interior wall of the tube or coupling or of the nature hereinbefore described.

By the words "non-fragile means" or "non-fragile protecting means" or "device" occurring hereinbefore and in the claims hereinafter I wish to be understood as meaning means which will not be caused to crush, crumble, or yield by the encroachment of the ends of the adjoining pipes to such an extent as to permit said adjoining pipes to damage the insulating-thimble of the coupling.

I am aware that it has heretofore been proposed to unite two or more armored conduits having an insulating-lining together by a coupling and separate the adjoining ends of said pipes by a vitreous ring, as is disclosed in United States Patent to D. Rylands, No. 438,023, granted October 7, 1890; but if such ring is subjected to undue pressure it would crush or crumble and defeat the purpose which my invention is designed to effect, and I make no claim hereinafter broad enough to include a vitreous or similar fragile means.

No claim is made in the present application to a pipe or tube coupling screw-threaded interiorly and having projecting sleeves at its opposite ends in combination with an insulating-thimble secured near its central portion nor to such a coupling in combination with conduit-tubes provided with insulating-linings and screw-threaded ends, as these features are made the subject-matter of my prior patent.

Having thus described my invention, what I claim, and desire to secure by Letters Patent of the United States, is—

1. A pipe or tube coupling provided with an interior insulating-thimble, in combination with non-fragile means for protecting the thimble against the destructive action of the ends of the pipes or tubes to be joined, substantially as described.

2. A pipe or tube coupling provided with an interior insulating-thimble and non-fragile means for protecting said thimble against the destructive action of the ends of the tubes to be joined, said coupling being screw-threaded interiorly, substantially as described.

3. A pipe or tube coupling provided with an interior insulating-thimble surrounded by a metallic wall of lesser diameter than the interior diameter of the coupling and adapted to protect the thimble from the destructive effects of the screw-threaded ends of pipes or tubes to be joined, substantially as described.

4. A pipe or tube coupling screw-threaded interiorly and provided with an insulating-thimble centrally located, said thimble being surrounded by two or more washers which hold it firmly in position and act also to protect it against the destructive action of the tubes or pipes to be joined, substantially as described.

5. A pipe or tube coupling screw-threaded interiorly and having at each end a projecting sleeve adapted to fit snugly about the body portions of the screw-threaded ends of the pipes or tubes to be joined together, in combination with an insulating-thimble located near the center of the coupling, said thimble being provided with means for protecting it against the destructive effects of the ends of said pipes or tubes, substantially as described.

6. The combination of a coupling-sleeve having an insulating-thimble and a metallic abutment concentric with and of greater diameter than said insulating-thimble, with two sections of metallic conduit having interior insulating-linings, in which combination the metallic sections when coupled impinge against the abutment while the insulating-linings impinge against the insulating-thimble, substantially as described.

In testimony whereof I have hereunto subscribed my name this 3d day of June, 1897.

EDWIN T. GREENFIELD.

Witnesses:
CHARLES J. KINTNER,
M. M. ROBINSON.